UNITED STATES PATENT OFFICE.

EMILE WARZÉE, OF BRUSSELS, BELGIUM.

PROCESS OF PRECIPITATING IRON FROM SOLUTIONS CONTAINING IRON AND ZINC.

SPECIFICATION forming part of Letters Patent No. 556,568, dated March 17, 1896.

Application filed August 28, 1894. Serial No. 521,487. (No specimens.) Patented in Germany March 4, 1894, No. 78,696.

*To all whom it may concern:*

Be it known that I, EMILE WARZÉE, a subject of the King of the Belgians, residing at Brussels, Belgium, have invented a new and useful Process of Separating Zinc and Iron Salts from Solutions Containing both Salts Mixed, (for which I have obtained Letters Patent in Germany, dated March 4, 1894, No. 78,696;) and I declare the following to be a specification describing the same.

The present invention refers especially to the separating of zinc and iron from an electrolyte solution such as remains in a galvanic battery after the working of the current, with $Fe_2Cl_6 + FeCl_2 + ZnCl_2 + Aq$ as electrolyte. The solution consists therefore of a compound of ferric chlorid, of protochlorid of iron and of chlorid of zinc.

In separating zinc and iron it will be understood that the zinc is converted into a solution of chlorid of zinc and the iron into ferroso ferric oxid.

In order to commence the process, I add zinc to the solution, which metallic zinc is oxidized, forming zinc oxid, which by double decomposition forms zinc chlorid and ferrous oxid, which then is further oxidized by the injection of air. By this addition of metallic zinc a solution will be created that consists actually of chlorid of zinc; but said solution will still have a very green color, which proves that a certain quantity of protochlorid of iron will still be mixed with the solution of chlorid of zinc. An equivalent mass of blackish-brown ferroso ferric oxid $Fe_3O_4$ will be found on the bottom of the receptacle. Thereafter an excess of zinc is added to the solution, and at the same time a powerful current of air of 90° centigrade, so that boiling is prevented. After hot air has been blown in during twelve to twenty hours by a mechanical contrivance, which keeps the liquid constantly stirred and in motion, the air passes out, very finely divided, from the center of the receptacle for the liquid, and the solution, which was green before, loses its color of chlorid of iron, said color disappearing completely, which is a positive proof that the chlorid of zinc is now free of iron.

This process is based upon the following reaction:

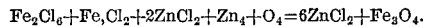
$$Fe_2Cl_6 + Fe_2Cl_2 + 2ZnCl_2 + Zn_4 + O_4 = 6ZnCl_2 + Fe_3O_4.$$

I claim—

The process for the precipitation of iron as ferroso ferric oxid from solution containing iron and zinc, consisting in adding zinc in excess and afterward blowing into the solution a current of air at a temperature of 90° centigrade to produce oxidation, said air also serving to keep the solution constantly stirred, substantially as described.

In testimony whereof I have hereto set my hand in the presence of the two subscribing witnesses.

EMILE WARZÉE.

Witnesses:
ALFRED WUNDERLICH,
GREGORY PHELAN.